United States Patent
Büchler

(10) Patent No.: US 7,266,057 B2
(45) Date of Patent: Sep. 4, 2007

(54) METHOD FOR GENERATING A LENS POSITION SIGNAL AND CORRESPONDING APPARATUS FOR READING FROM AND/OR WRITING TO AN OPTICAL RECORDING MEDIUM

(75) Inventor: Christian Büchler, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 536 days.

(21) Appl. No.: 10/450,223

(22) PCT Filed: Dec. 5, 2001

(86) PCT No.: PCT/EP01/14293

§ 371 (c)(1),
(2), (4) Date: Jun. 11, 2003

(87) PCT Pub. No.: WO02/49023

PCT Pub. Date: Jun. 20, 2002

(65) Prior Publication Data

US 2004/0066715 A1    Apr. 8, 2004

(30) Foreign Application Priority Data

Dec. 13, 2000 (DE) ............................... 100 62 078

(51) Int. Cl.
G11B 7/095 (2006.01)

(52) U.S. Cl. ................. 369/44.29; 369/53.28; 369/44.37

(58) Field of Classification Search ............... None
See application file for complete search history.

(56) References Cited

U.S. PATENT DOCUMENTS

| | | |
|---|---|---|
| 5,050,153 A | 9/1991 | Lee |
| 5,159,589 A | 10/1992 | Ohsato |
| 5,216,652 A | 6/1993 | Yoshio et al. |

(Continued)

FOREIGN PATENT DOCUMENTS

DE    693 24 983 T2    5/1999

(Continued)

OTHER PUBLICATIONS

Search Report.

*Primary Examiner*—William Korzuch
*Assistant Examiner*—Joseph Haley
(74) *Attorney, Agent, or Firm*—Joseph J. Laks; Ronald H. Kurdyla; Joseph J. Opalach

(57) ABSTRACT

In order to generate a lens position signal, which describes the position of the optical axis of an objective lens of an apparatus for reading from and/or writing to an optical recording medium with regard to the optical axis of the remaining components contained in an optical scanner, the application of the DPP method is proposed in accordance with a first exemplary embodiment, wherein a primary-beam error signal and a secondary-beam error signal are obtained with the aid of the DPP method, wherein the desired lens position signal is generated by addition of the primary-beam error signal and the secondary-beam error signal. In accordance with a second exemplary embodiment, it is not necessary to generate a primary beam, rather it suffices to detect the secondary beams reflected from the optical recording medium in order to obtain the lens position signal by addition of the secondary-beam error signals generated in a manner dependent thereon.

14 Claims, 11 Drawing Sheets

U.S. PATENT DOCUMENTS

| | | | |
|---|---|---|---|
| 5,341,353 A * | 8/1994 | Yoshio et al. | 369/44.28 |
| 6,388,963 B1 * | 5/2002 | Tanaka | 369/44.26 |
| 6,721,242 B2 * | 4/2004 | Ohnishi et al. | 369/44.26 |
| 6,847,599 B2 * | 1/2005 | Hayashi | 369/53.22 |
| 2004/0109396 A1 * | 6/2004 | Nakano et al. | 369/44.25 |

FOREIGN PATENT DOCUMENTS

| | | |
|---|---|---|
| EP | 0 201 603 | 11/1986 |
| EP | 0 512 625 | 11/1992 |
| EP | 0 766 235 | 4/1997 |
| EP | 0 589 611 | 5/1999 |
| JP | 63179420 | 7/1988 |

* cited by examiner

METHOD FOR GENERATING A LENS POSITION SIGNAL AND CORRESPONDING APPARATUS FOR READING FROM AND/OR WRITING TO AN OPTICAL RECORDING MEDIUM

This application claims the benefit under 35 U.S.C. § 365 of International Application PCT/EP01/14293, filed Dec. 5, 2001, which claims the benefit of German Patent Application No. 100 62 078.7, filed Dec. 13, 2000.

BACKGROUND OF THE INVENTION

The present invention relates to a method for generating a lens position signal, which describes the position of the optical axis of an objective lens of an apparatus for reading from and/or writing to an optical recording medium with regard to the optical axis of an optical scanner used in this apparatus, and also to a correspondingly configured apparatus for reading from and/or writing to an optical recording medium.

A track error signal is conventionally generated in apparatuses for reading from and/or writing to optical recording media, such as, for example, optical recording media (e.g. DVD-RAM) in which information tracks are contained both in depressions (G), designated as "groove", and in elevations (L), designated as "land", which track error signal can be used for tracking regulation in the respective apparatus. One of the widespread methods for forming the track error signal is the so-called "differential push-pull" (DPP) method, as is described for example in EP 0 745 982 A2. In this case, the laser beam output by a laser diode is split into three beams, namely a primary beam and two secondary beams which scan mutually adjacent tracks of the optical recording medium respectively used. The primary and secondary beams reflected from the optical recording medium are evaluated in order to obtain, in a manner dependent thereon, primary-beam and secondary-beam track error signals from which the desired track error signal is generated by means of weighted combination.

A corresponding arrangement is illustrated by way of example in FIG. 8. The light emitted by a light source or a laser 1 passes through a collimator lens 2 and is then split into the primary beam (i.e. a 0th-order beam) and the two secondary beams (i.e. ±1st-order beams) by a diffraction grating 3. The primary beam, which reads the information to be scanned in a track of a corresponding recording medium 7, usually contains the majority (approximately 80–90%) of the light information. The two secondary beams each contain the remaining 5–10% of the total light intensity, it being assumed for the sake of simplicity that the light energy of the higher orders of diffraction of the diffraction grating 3 is zero. These three beams are focused onto the optical recording medium 7 via a polarizing beam splitter 4 and a quarter-wave plate 5 and also an objective lens 6, in order to read from and/or write to the said optical recording medium. The three beams reflected from the optical recording medium 7 are fed via the beam splitter 4 and a cylindrical lens 8 to a photodetector unit 9, which detects the three beams reflected from the optical recording medium 7. The three beams are indicated symbolically in the figure between cylindrical lens 8 and photodetector unit 9. Connected to the photodetector unit 9 is an evaluation unit 10, which evaluates the detected signals of the reflected primary and secondary beams for the purpose of generating a track error signal.

The diffraction grating 3 is incorporated in such a way that the imaging of the two secondary beams scans precisely the centre of the secondary tracks or (in the case of media which can be written to only in "groove" tracks) the centre beside the track scanned by the primary beam. Since the secondary beams and the primary beam are intended to be optically separable from one another, the positions of their imaging on the optical recording medium 7 and on the photodetector unit 9 are separate from one another. If the optical recording medium 7 rotates, then one of the secondary beams is situated in front of, and the other secondary beam behind, the primary beam in the reading or writing direction. The evaluation unit 10 of the arrangement shown in FIG. 8 evaluates the light intensities reflected onto the photodetector 9 separately for each of the three beams.

In the evaluation unit 10, the detected signals both of the primary beam and of the secondary beams are used to generate, considered by themselves in each case, a push-pull signal which represents the track error of the respective beam with respect to the track. However, since the two secondary beams scan the secondary tracks with respect to the read/write track, their push-pull track error is inverted with respect to that of the primary beam. Considered by themselves, the respective push-pull components thus contain the actual track error with respect to the respectively scanned track. Since the track position of the three beams can only change together, the three push-pull signals change equally.

The objective lens 6 of an optical scanner 21 as sketched in FIG. 8 must be mounted in a movable manner in order, even in the case of an optical recording medium 7 which has vertical wobble and/or eccentricity, to make it possible to focus the scanning beam and keep it on a predetermined track. That part of the scanner 21 which comprises the elements 2, 3, 4, 5, 8, 9 defines an optical axis 22. The objective lens 6 is arranged in its rest position ideally in such a way that its optical axis 23 corresponds to the optical axis 22 of the other optical components of the optical scanner 21.

The movement of the objective lens 6 is usually achieved by means of an electromagnetic drive. In this case, the objective lens is kept in a predetermined rest position by an arrangement of articulated joints or springs, from which position it can be deflected from its rest position by application of a current to the electromagnetic drive. To that end, the output signals of the evaluation unit 10 provide track error and focus error signals which encompass the position of the objective lens 6 and correct it with the aid of regulating circuits.

If the intention is to scan an optical recording medium 7 whose tracks are applied in spiral form, then the objective lens 6 is deflected to an increasing extent during a continuous scanning operation. Its optical axis 23 is therefore displaced increasingly far from the optical axis 22 of the other optical components. In order to counteract this displacement of the optical axes with respect to one another, provision is usually made of a servo or linear motor which subsequently shifts the scanner 21 with the optical components 2, 3, 4, 5, 8, 9 incorporated therein in such a way that the optical axes deviate from one another as little as possible. This motor is usually referred to as coarse track motor. According to the prior art, the driving voltage of the electromagnetic drive of the objective lens is used as a criterion for the deviations of the optical axes and the coarse track motor is driven in such a way that the driving voltage tends to zero.

For this purpose, provision is made of a further regulating circuit, which ensures that the optical axes 22, 23 of scanner 21 and objective lens 6 correspond. According to the prior art, the driving voltage of the electromagnetic drive of the objective lens 6 is evaluated for this purpose. In this case, it is assumed that the optical axis 23 of the objective lens 6 does not deviate from the axis of the other components 22 when the drive coils are de-energized. Since the objective lens is suspended in a resilient fashion, this assumption is not correct in all operating situations. By way of example, the objective lens changes its position even without driving of the drive coils if external forces act on it, as may occur in the event of an impact against the player. Furthermore, ageing of the articulated joints or springs may cause the rest position of the objective lens to be changed such that the optical axes deviate from one another. These effects cannot be detected from the driving voltage of the drive coils.

If the objective lens 6 is then moved for example during a track jump, the imaging of the primary and secondary beams on the photodetector unit 9 also moves. This displacement of the imaging results in an offset voltage at the output of the evaluation unit 10, the direction of this offset voltage being identical for all of the beams. The displacement of the objective lens 6 thus gives rise to an offset voltage which does not originate from an actual track error and is therefore an interference. The genuine track error component and the undesirable lens-movement-dependent component are added in the push-pull signal which is detected by the respective detectors of the photodetector unit 9 and yielded by the evaluation unit 10.

If the push-pull signals of the secondary beams are then added and this sum is subtracted from the push-pull signal of the primary beam, this undesirable lens-movement-dependence component is cancelled out given appropriate weighting between the primary and secondary beam components. By contrast, since the push-pull components of primary and secondary beams are inverted with respect to one another, they are added in the correct phase after application of the subtraction, with the result that, given correct setting of the weighting factor, the actual track error is obtained. A method for determining a suitable weighting factor is described by way of example in EP 0 708 961 B1.

From the previously described properties of the conventional DPP method, it is apparent that, owing to the position of the secondary beams, the phase shift between the primary beam and the secondary beams is nominally 180 degrees. This is advantageous since, as a result of the difference formation, the track error components of the primary beam and of the secondary beams are added with the largest possible amplitude. If the position of the beams on the tracks is considered, then the angle of the diffraction grating 3 is set, for achieving the maximum amplitude of the track error signal, precisely in such a way that (for example in the case of a DVD-RAM) the secondary beams impinge on the track centres of the secondary tracks or (in the case of media which can be written to only in "groove" tracks) precisely on the region between two tracks beside the track scanned by the primary beam.

The aim of the DPP method described previously is to form a track error signal which has no offset dependence on the position of the objective lens 6 relative to the optical axis of the scanner respectively used. In the case of the previously described combination of the push-pull components of the primary beam and of the secondary beams, although the actual track error can be obtained, owing to the cancellation of the lens-movement-dependence component it is nonetheless not possible to detect the position of the objective lens 6 with regard to the optical axis of the scanner.

During a track following operation, the objective lens 6 is displaced perpendicularly to the track direction of the optical recording medium 7, i.e. the optical axis of the objective lens 6 is moved away from the optical axis of the scanner 21. This results in a corresponding displacement of the imaging of the reflected scanning beam on the detector elements of the photodetector unit 9. While the respectively scanned track is followed correctly, the evaluation unit 10 cannot recognize in this case that the optical axes of objective lens 6 and scanner 21 do not correspond. For this reason, it is necessary, in principle, to provide a signal which describes the position of the objective lens 6 with regard to the optical axis 22 of the scanner 21.

It is furthermore advantageous, during a positioning operation, as is necessary for example for an access to another piece of music on a CD, to provide for the control unit of the apparatus auxiliary signals which enable a fast access to the piece of music desired by the user of the apparatus.

SUMMARY OF THE INVENTION

An object of the present invention is to propose a method for generating a lens position signal, which describes the position of the objective lens with regard to the optical axis of an optical scanner, and also a corresponding apparatus for reading from and/or writing to an optical recording medium. Furthermore, possibilities for generating auxiliary signals for an improved track jump are shown.

This object is achieved according to the invention by means of a method having the features of Claim 1 or 11 and an apparatus having the features of Claim 20 or 27. The subclaims each define preferred and advantageous embodiments of the present invention.

A first exemplary embodiment of the present invention proposes that the lens position signal be generated by employing the DPP method described in the introduction. In contrast to the prior art described in the introduction, however, the push-pull signal of the secondary beams is added to the push-pull signal of the primary beam in order to obtain the lens-movement-dependent component. In this case, in particular, a weighted addition is carried out, in which case the weighting factor can be set to an ideal value in a manner dependent on the distance between the two secondary beams and the primary beam and on the track spacing. In a variant of the first exemplary embodiment, a normalization of the signals derived from the beams used is provided in order to simplify the setting of the weighting factor.

In accordance with a second exemplary embodiment of the present invention, the lens position signal is derived directly from the push-pull signals of the secondary beams, i.e. the push-pull signal of the primary beam is in this case not included in the generation of the lens position signal. In this case, it is particularly advantageous if the secondary beams are imaged on the optical recording medium in accordance with the following formula:

$$\Delta x = (2n-1) * \frac{p}{2} \text{ where } n = 0, 1, 2, \ldots \quad (1)$$

In this case, $\Delta x$ designates the distance between the secondary beams and the (imaginary or existing) primary beam and p designates the track spacing. In the latter, the track error components of the push-pull signals of the two secondary beams cancel one another out, so that the resultant summation signal only comprises the lens-movement-dependent contribution and, consequently, corresponds to the desired lens position signal, which can be used for example in the event of a track jump for stabilization of the actuator.

In the case of the previously described orientation of the secondary beams, it is additionally possible to generate a direction signal from the phase between the difference signal of the two push-pull signals of the secondary beams and the push-pull signal of the primary beam. Equally, it is possible to generate a track error signal.

The present invention is explained in more detail below using preferred exemplary embodiments with reference to the accompanying drawings.

DETAILED DESCRIPTION

Figure 1:
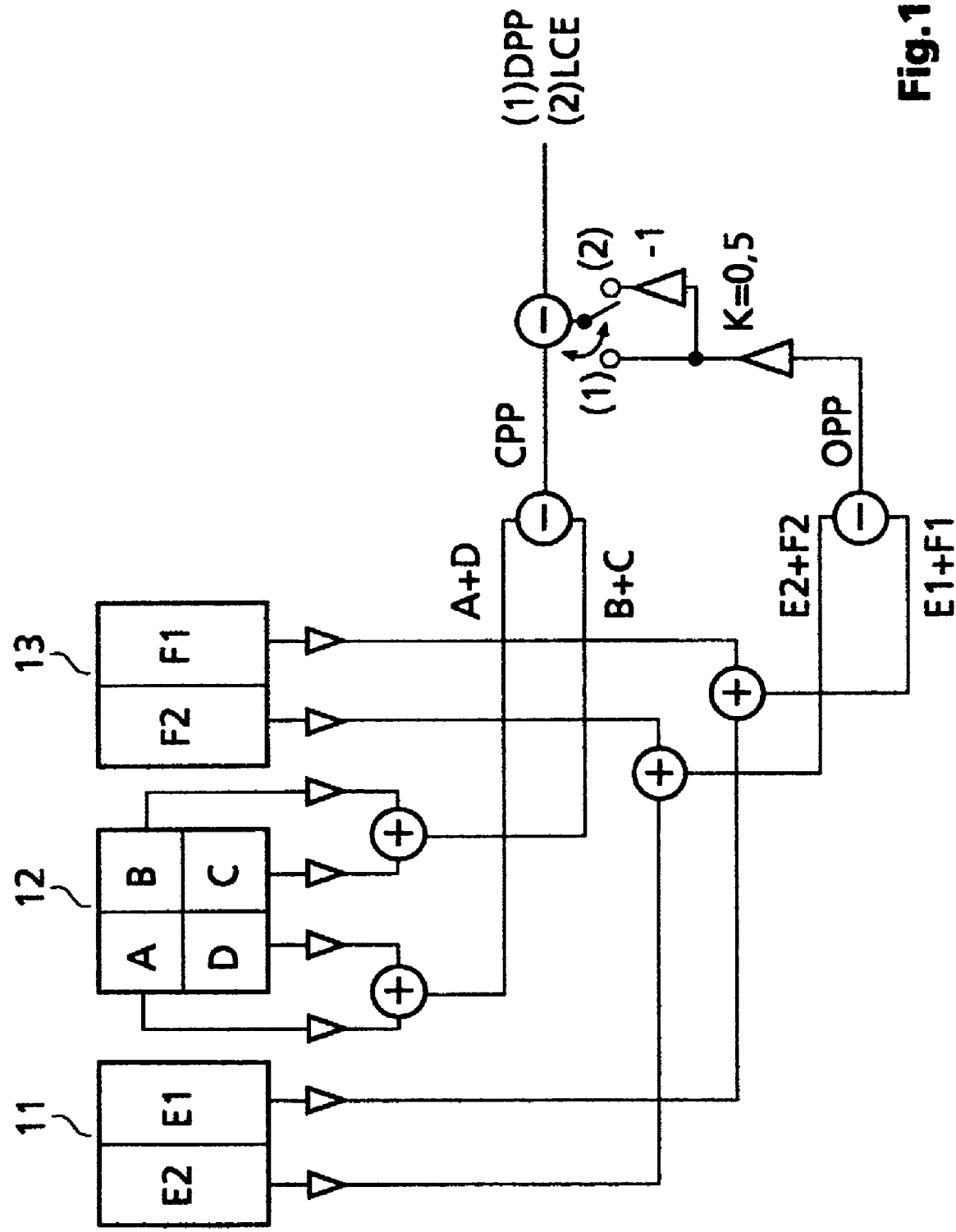
FIG. 1 shows a first exemplary embodiment of the present invention for generating a lens position signal.

As was described in the introduction, the track error signal generated in accordance with the DPP method is composed of the corresponding component of the primary beam and the added components of the secondary beams, in accordance with the prior art the components of the secondary beams being added and the resultant sum being subtracted from the component of the primary beam with appropriate weighting.

For all of the following considerations, it is assumed in a simplification that the intensities of the three scanning beams considered are identical when impinging on the photodetector unit 9. In practice, however, the intensity of the secondary beams is dependent on their track position, on the reflection of the scanned track and also on the properties of the diffraction grating 3 and is weaker than the intensity of the primary beam, so that the intensity of the secondary beams has to be scaled correspondingly with respect to the primary beam intensity. This can ideally be done by means of a normalization.

Under the above-described assumption, the following relationships hold true; in this respect, also see, for example, FIG. 4 described in more detail further below:

$$DPP = CPP - K*OPP \tag{2}$$

$$CPP = a*\sin\left(2\pi * \frac{x}{2p}\right) + kl \tag{3}$$

$$OPP = a*\left(\sin\left(2\pi * \frac{x+\Delta x}{2p}\right) + \sin\left(2\pi * \frac{x-\Delta x}{2p}\right)\right) + k(l+l) \tag{4}$$
$$= a*\left(\sin\left(2\pi * \frac{x+\Delta x}{2p}\right) + \sin\left(2\pi * \frac{x-\Delta x}{2p}\right)\right) + 2kl$$

In this case, DPP designates the signal obtained in accordance with the DPP method, CPP designates the corresponding component of the primary beam, OPP designates the component of the secondary beams, K designates a weighting factor, x designates the scanning position of a beam relative to the track centre, $\Delta x$ designates the distance between the two secondary beams and the primary beam and p designates the track spacing, which in this case, corresponding to the definition in accordance with the DVD-RAM standard, is measured between the centres of two adjacent tracks. l designates the movement of the objective lens 6 from the rest position. The amplitudes a and k are factors which depend on the geometry of the scanned tracks, the sensitivity of the photodetector unit 9, etc. Since the three beams are mechanically coupled to one another, the variables x and l in the formulae for the CPP signal and the OPP signal are identical in each case.

In order to achieve compensation of the lens-movement-dependent component 1, the following equation must be satisfied:

$$DPP_l = CPP_l - K*OPP_l = 0 \tag{5}$$

In this case, the index "l" respectively designates the lens-movement-dependent component of the corresponding signal. Taking account of formulae (3) and (4) above, it follows for the weighting factor for compensation of the lens-movement-dependent component that:

$$K = 0.5 \tag{6}$$

This weighting factor K is independent of the orientation of the secondary beams with regard to the primary beam.

It is usually attempted to make the track error amplitude maximum by setting the distance $\Delta x$ accordingly. This is achieved, in the case of evaluation of formulae (2) to (4) above with K=0.5, when the following relationship holds true:

$$\cos\left(\pi * \frac{\Delta x}{p}\right) = -1 \tag{7}$$

Since the cosine function is periodic, this holds true for:

$$\Delta x = (2n+1)*p$$

where $$n = 0, 1, 2 \tag{8}$$

It follows from formulae (2) to (4) that when a new weighting factor G with a negative sign is used, i.e. when the subtraction of the OPP signal from the CPP signal is replaced by an addition of these two signals, only the lens-movement-dependent component is retained, while the individual track error components cancel one another out. In particular, the following relationship must hold true for compensation of the track error components:

$$DPP_x = CPP_x - G*OPP_{x=}0 \qquad (9)$$

In this case, the index "x" designates the track-error-dependent component of the respective signal. The relationship of (9) is satisfied taking account of relationships (3) and (4) above if the following holds true:

$$DPP_x = a*\sin\left(\pi * \frac{x}{p}\right)*\left(1 - 2G\cos\left(\pi * \frac{\Delta x}{p}\right)\right) \equiv 0 \qquad (10)$$

The track-error-dependent component of the DPP signal can thus be eliminated in a manner dependent on $\Delta x$ and $p$ if the following holds true:

$$1 - 2G\cos\left(\pi * \frac{\Delta x}{p}\right) = 0 \qquad (11)$$

Given an assumed distance between the secondary beams and the primary beam of $\Delta x=p$, the following results in this respect:

$$G=-0.5 \qquad (12)$$

From the negative sign of the weighting factor G in accordance with formula (12), it emerges that the subtraction must be replaced by an addition. If the secondary beams are arranged at $\Delta x=p$, the application of the addition of the CPP and OPP signals thus suffices to make the track error components tend to zero and to obtain the lens-movement-dependent component. With G=−0.5, by inserting $\Delta x=p$ into formulae (2) to (4), the lens-movement-dependence component is obtained as follows:

$$DPP_l = 2kl \qquad (13)$$

The signal thus obtained contains only the lens-movement-dependent component; it is designated by LCE (Lens Centre Error).

FIG. 1 illustrates a corresponding exemplary embodiment for generating the lens-movement-dependent component for the corresponding lens position signal LCE by employing the DPP method. In this case, it is assumed that the photodetector unit 9 for detecting the reflected primary beam has a photodetector unit 12 having four photosensitive areas A–D, while respective photodetector elements 11, 13 having only two photosensitive areas E1, E2 and F1, F2, respectively, are provided for detecting the reflected secondary beams. As can be seen from FIG. 1, provision is made of an amplifier having a gain factor −1 and, in order to change over from track regulation operation to lens position control, a switch, the signals CPP and 0.5·OPP being either subtracted or added depending on the switch position.

Figure 2:
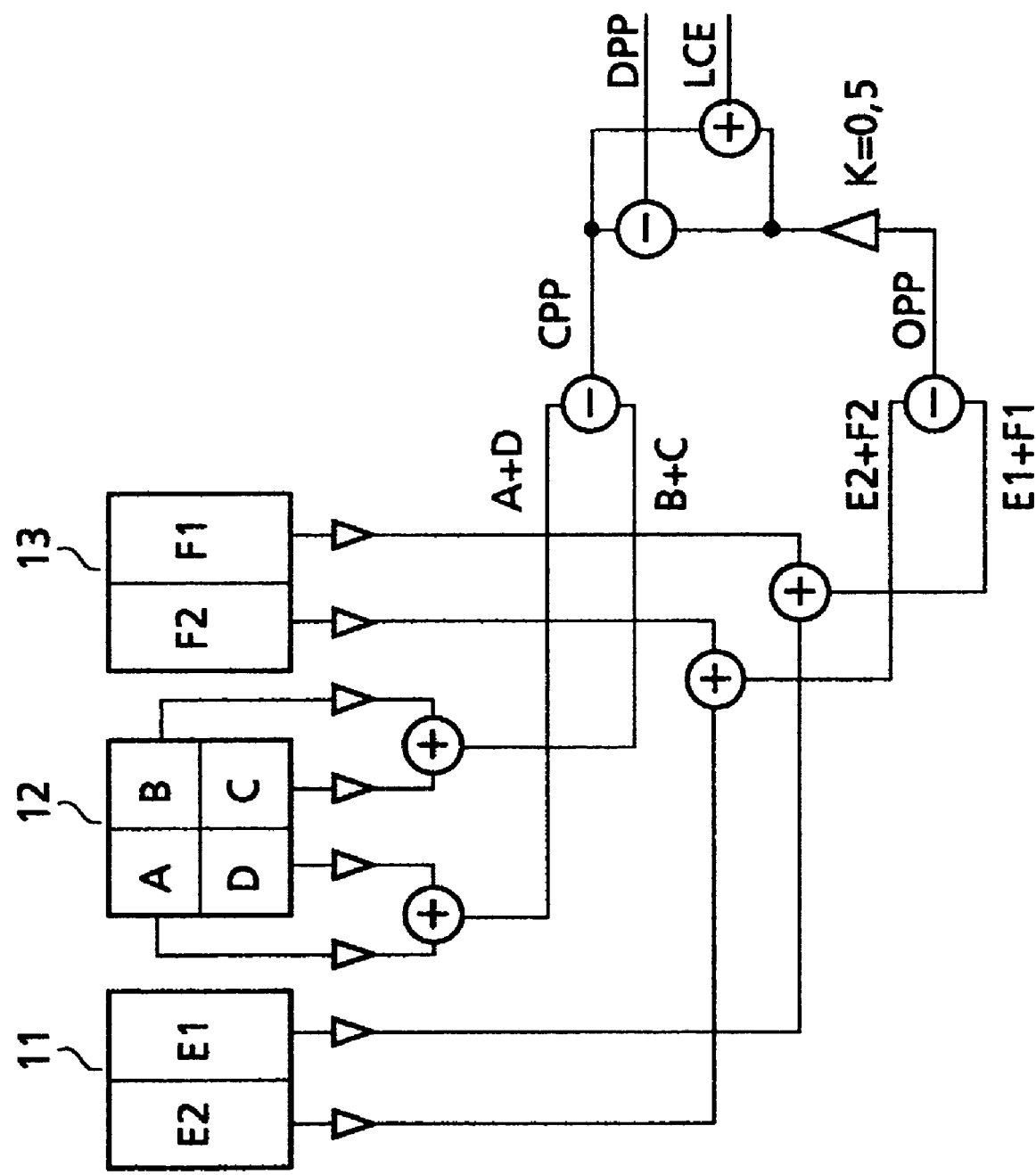
FIG. 2 shows a variant of the first exemplary embodiment shown in FIG. 1.

In order to be able to measure the lens position during the playback operation of the optical recording medium 7, it is necessary simultaneously to form the track error signal DPP from the difference and also the lens position signal LCE from the sum of the partial signals CPP and OPP. FIG. 2 shows a corresponding variant of the exemplary embodiment shown in FIG. 1. Since both signals are available simultaneously in this case, the track regulating circuit can be closed and, at the same time, the information about the lens position can be used for readjusting the coarse track motor of the optical scanner 21.

If the distance $\Delta x$ between the secondary beams and the primary beam is not $\Delta x=p$ but rather $\Delta x=3/4p$, for example, the following results for the weighting factor G, which leads to the compensation of the track error component, in accordance with formula (11):

$$G = -\frac{1}{\sqrt{2}} \qquad (14)$$

Figure 3:
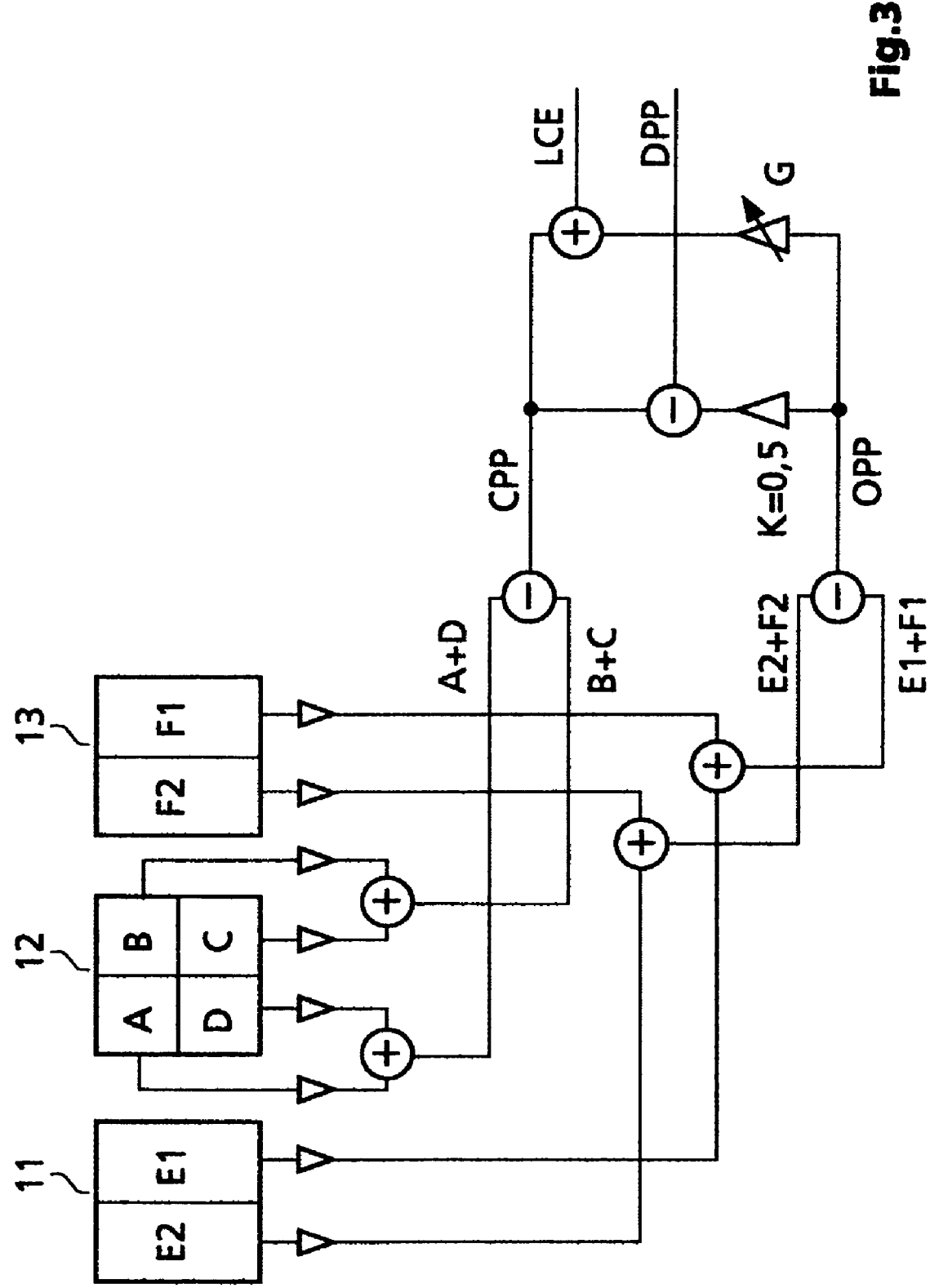
FIG. 3 shows a further variant of the first exemplary embodiment shown in FIG. 1.

In this case, the optimum weighting factor K for generating the track error signal differs from the weighting factor G required for generating the lens position signal not only in terms of sign but also in terms of magnitude. The weighting factor K for suppressing the lens-movement-dependent component is ideally always 0.5, while the weighting factor for compensation of the track error component is always negative, but is to be adapted to the position of the secondary beams. Accordingly, the arrangement shown in FIG. 2 can be modified as shown in FIG. 3, in which case the weighting factor used for generating the lens position signal LCE can be set in a variable manner.

If a variably adjustable weighting factor is provided, secondary track distances $\Delta x$ different from those mentioned above can also be used in conjunction with the DPP track error method. Track distances in the range of $p/2<\Delta x<3p/2$ can theoretically be utilized. The limits $p/2$ and $(3/2)*p$ cannot be utilized in practice since the track error contribution in the signal component OPP becomes zero here and, even given an infinitely large factor G set, compensation of the track error contribution of the CPP signal could not be achieved.

Instead, it is possible here to use the sum of the signals OPP1 and OPP2 alone in order to obtain a lens position signal. This is illustrated in the following section and also in FIGS. 4 and 5. If the formation of a track error signal according to the DPP method is disposed with, then the lens position signal can also be formed with arbitrary secondary track distances $\Delta x$. Limiting cases emerge here as $\Delta x=0$ or $\Delta x=2\cdot n\cdot p$, since the track-error-dependent components of the partial signals CPP, OPP1 and OPP2 are in phase here and compensation of these components cannot be achieved.

Furthermore, it should be noted that the sign of the weighting factor G is reversed for $0<\Delta x<p/2$ and also for $3p/2<\Delta x<2p$.

The previously described method for generating the lens position signal LCE using the DPP method is suitable, in particular, for all optical recording media which, on account of their physical construction, are suitable for application of the DPP method if, at the same time, a track error signal is intended to be generated. However, the position of the optical axis of an objective lens with regard to the optical axis of an optical scanner can also be ascertained if the optical recording medium 7 is not suitable for application of the DPP method. Corresponding examples of this will be explained below.

The lens position signal LCE can be formed, for example, in accordance with a further exemplary embodiment, if the secondary beams are imaged with the following distance $\Delta x$:

$$\Delta x = (2n-1) * \frac{p}{2} \text{ where } n = 0, 1, 2, \ldots \tag{15}$$

The consequence of this is that the track error components of the two secondary beams OPP1=(E2−E1) and OPP2=(F2−F1) cancel one another out and their magnitude with respect to the track error signal becomes zero. This means that the summation signal OPP yields only the contribution dependent on the lens movement l and, consequently, corresponds directly to the lens position signal LCE.

Figure 4:
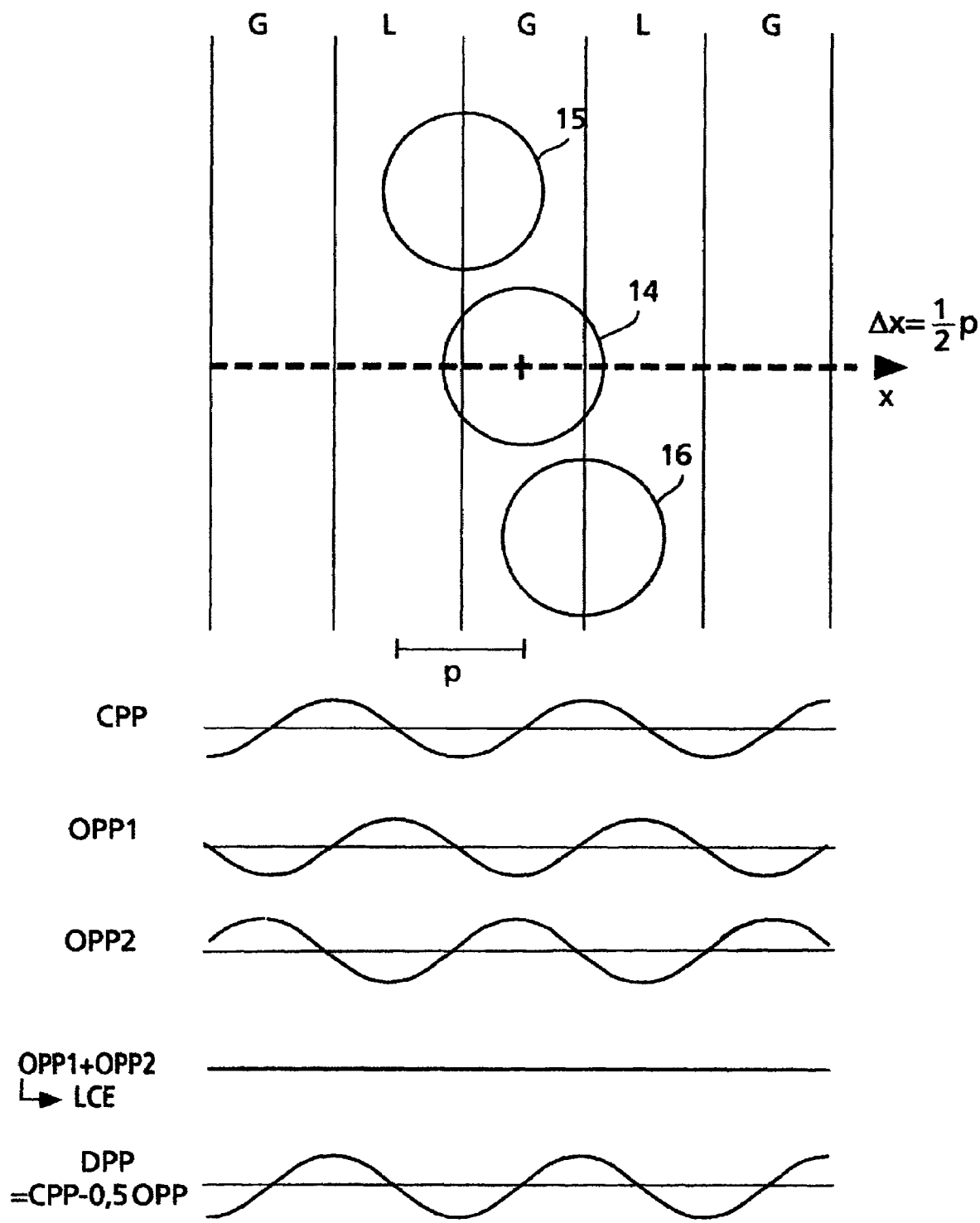
FIG. 4 shows a track image with the beam arrangement of the primary beam and secondary beams and the push-pull signals obtained with this beam arrangement in accordance with a second exemplary embodiment of the present invention.

As is shown in FIG. 4, a scanner which uses a three-beam track error signal for track regulation typically has two secondary beams 15, 16, which are imaged on the optical recording medium with Δx=p/2 beside the primary beam 14. In this case, Δx is measured in the direction of the imaginary x-axis depicted, whose origin lies in the centre of the scanning spot of the primary beam 14, in this case in the centre of a track. As is also shown in FIGS. 1 to 3, the photodetectors used for detecting the reflected secondary beams 15, 16 are in each case divided into two parts in order simultaneously to obtain a track error signal and a lens position signal. The separation of the photodetector areas is such that the beams reflected from the optical recording medium impinge symmetrically with respect to the separating line.

FIG. 4 illustrates a track image for such a beam arrangement of the secondary beams with Δx=p/2 and also the resultant track error signals. A corresponding arrangement for obtaining the signals illustrated in FIG. 4 is shown in FIG. 5.

As can be seen from FIG. 4, the track error components of the two secondary beam signals OPP1 and OPP2 cancel one another out, so that the summation signal OPP=OPP1+OPP2 yields only the contribution dependent on the lens movement l and, consequently, corresponds to the desired lens position signal LCE. With this orientation of the secondary beams, it is additionally possible to generate a direction signal DIR from the phase between the difference signal OPP1−OPP2 and the CPP signal with the aid of a phase comparator shown in FIG. 5, since the phase of these two signals with respect to one another is +90° or −90° depending on the direction of movement. A track error signal TE is likewise available which, however, has only half the amplitude of the ideal DPP signal. Moreover, as is shown in FIG. 5, it is possible to obtain a so-called "Track Zero Cross" signal TZC and also the information of what type of track (groove or land) the scanning beam is presently scanning.

Figure 5:
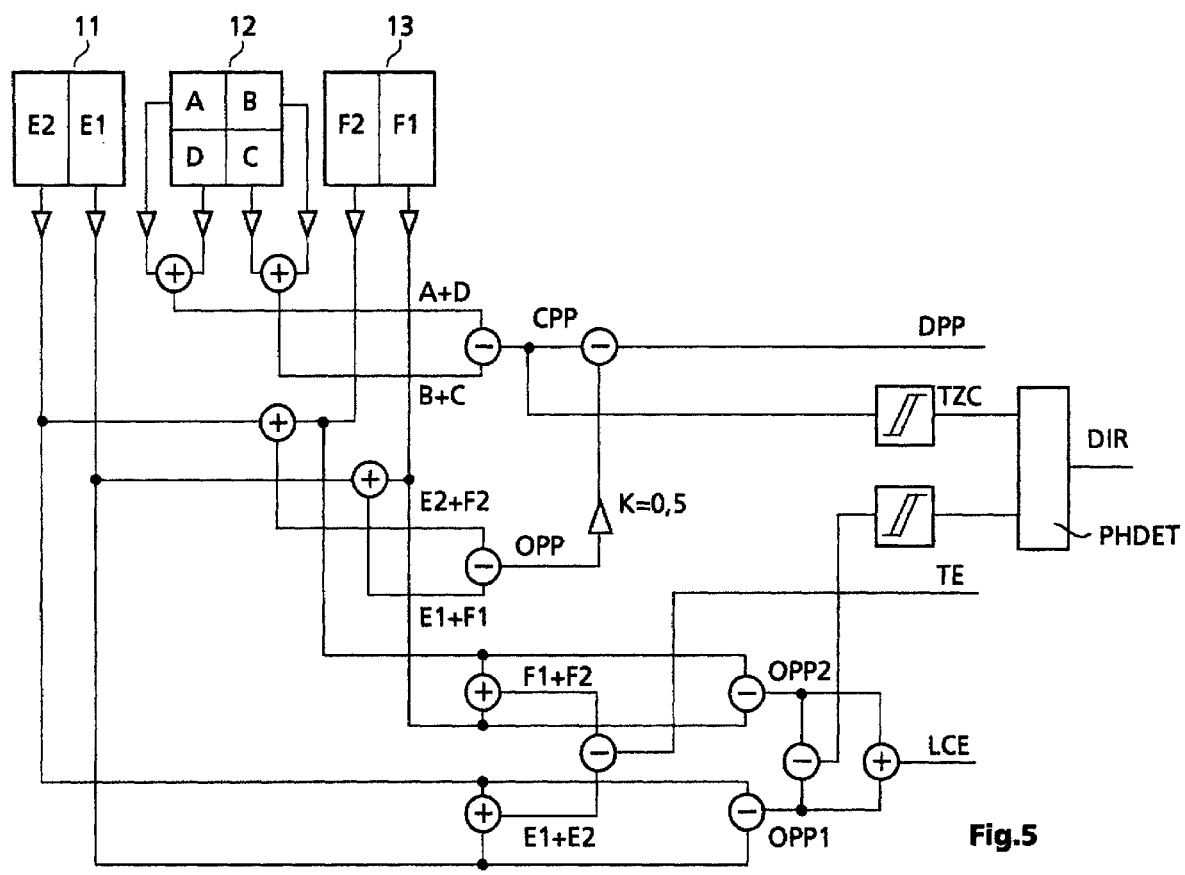
FIG. 5 shows the second exemplary embodiment of the present invention for generating a lens position signal.

The track zero cross signal TZC is obtained from the signal CPP by means of a comparator in FIG. 5. Instead of this, as an alternative it may also be obtained from the corrected signal DPP. Another alternative, not illustrated here, provides for only one of the signals OPP1 or OPP2 to be used, instead of the difference OPP1−OPP2. This obviates the difference formation; the signal fed to the comparator then has only half the amplitude, as can be seen from FIG. 4.

Figure 8:
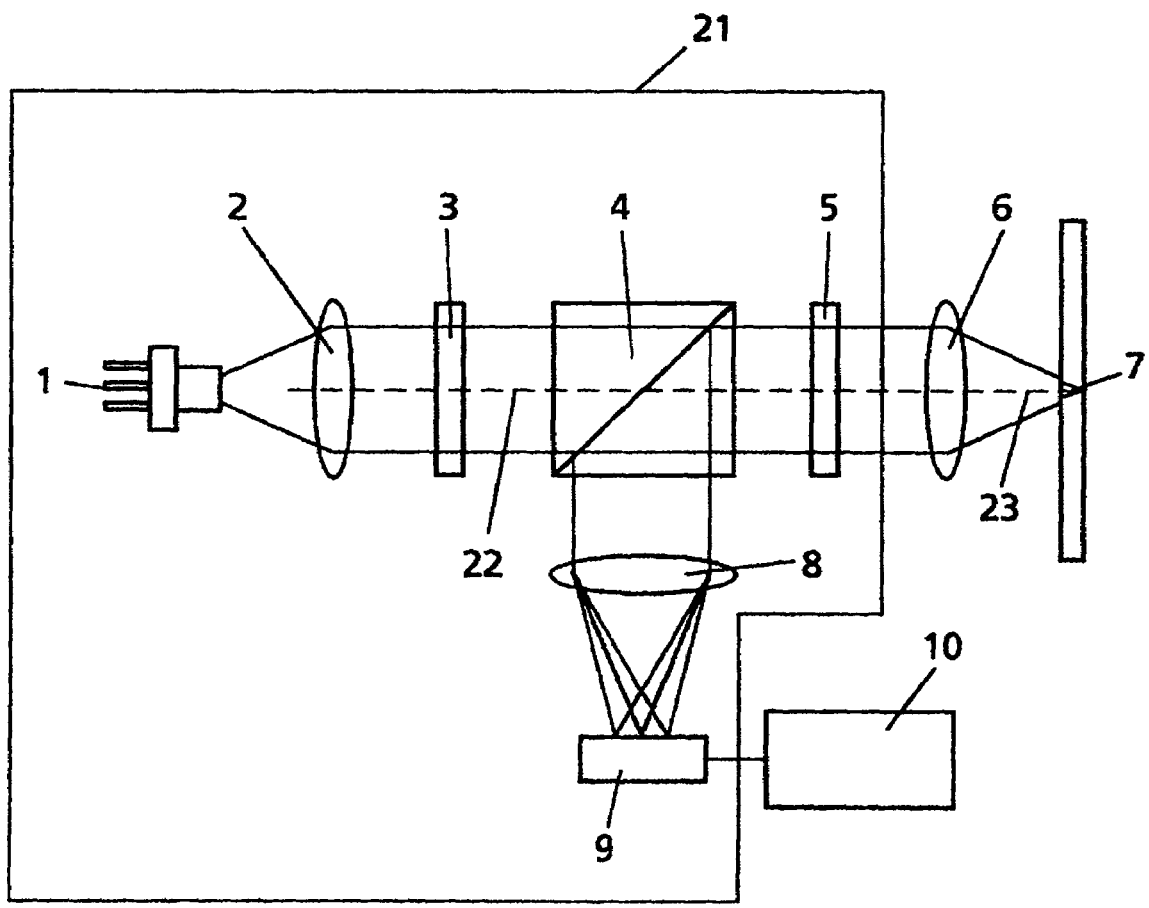
FIG. 8 shows a simplified construction of an optical scanner for carrying out the DPP method according to the prior art, and this construction can also be applied to the present invention.

By means of a corresponding configuration of the diffraction grating 3 shown in FIG. 8, it is also possible to direct onto the optical recording medium 7 only two or, alternatively, more than three beams in such a way that at least one of the beams impinges on a "groove" track and generates a corresponding track error signal, while another beam impinges on a "land" track and likewise generates a corresponding track error signal which is phase-shifted through 180° with respect to the track error signal of the first-mentioned beam. If these two signals are added to one another, then the track error component contained therein is likewise cancelled out, and all that remains is the component dependent on the lens movement l of the objective lens 6.

Furthermore, the present invention can also be applied to scanners with holographic optical components, provided that two (secondary) beams are generated which impinge on the optical recording medium 7 at a distance of Δx=(2n−1)·p/2 from an (imaginary or existing) primary beam and whose imaging on a correspondingly configured photodetector unit 9 or an evaluation unit 10 generates two push-pull signals which have a phase shift of 180° with regard to their track error component, provided that the components proportional to the lens movement are added in the correct phase.

Figure 6:
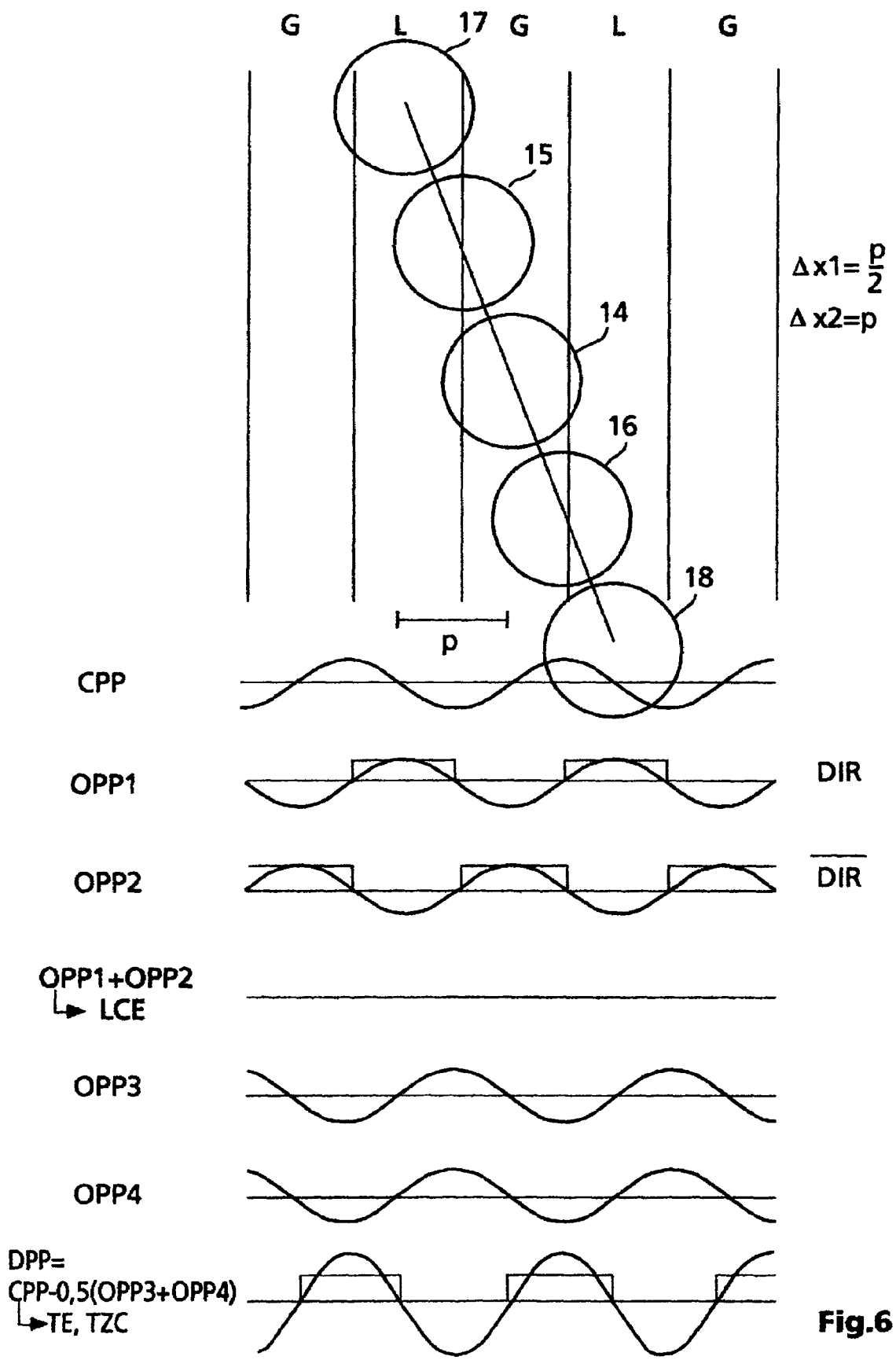
FIG. 6 shows a beam arrangement of a primary beam and four secondary beams and also the push-pull signals obtained with this beam arrangement with a variant of the second exemplary embodiment.

This is realized for example in a five-beam scanner, the ±1st-order secondary beams in each case impinging on the edges between a "groove" and a "land" track, while the ±2nd-order secondary beams impinge on the track centres of the adjacent tracks of the primary beam. A corresponding track image is illustrated in FIG. 6, the primary beam again being provided with the reference symbol 14, the 1st-order secondary beams being provided with the reference symbols 15, 16 and the 2nd-order secondary beams being provided with the reference symbols 17, 18. The distance between the 1st-order secondary beams 15, 16 and the primary beam 14 is thus Δx1=p/2, while the distance between the 2nd-order secondary beams 17, 18 and the primary beam 14 is Δx2=p.

Figure 7:
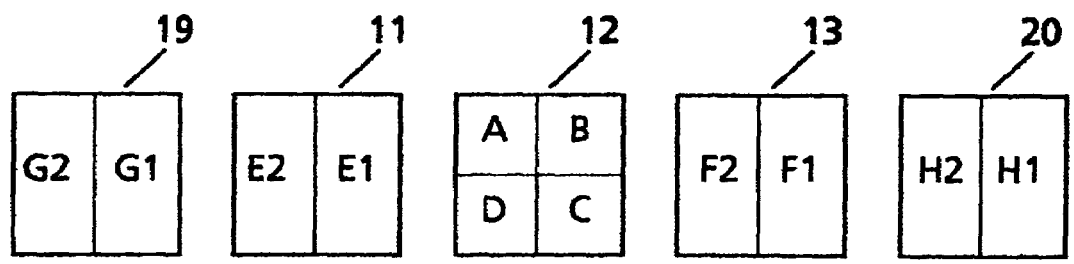
FIG. 7 shows, by way of example, a photodetector unit for detecting the reflected primary and secondary beams shown in FIG. 6.

FIG. 7 illustrates an exemplary embodiment of the individual photodetectors 11–13 and 19, 20 of the photodetector unit, which each serve for detecting a beam 14–18 reflected from the corresponding optical recording medium. In this case, the primary beam 14 is detected by a photodetector element 12 having four light-sensitive areas A–D, while the secondary beams are in each case detected by photodetector elements 11, 13, 19 and 20, respectively, having two light-sensitive areas E1, E2, F1, F2, G1, G2 and H1, H2, respectively. From the output signals of the light-sensitive areas of the individual photodetector elements, the following push-pull signals are again determined by an evaluation unit, which signals are illustrated by way of example in the lower part of FIG. 6:

$$CPP=(A+D)-(B+C) \tag{16}$$

$$OPP1=E2-E1 \tag{17}$$

$$OPP2=F2-F1 \tag{18}$$

$$OPP3=G2-G1 \tag{19}$$

$$OPP4=H2-H1 \tag{20}$$

A DPP signal is formed for example from the difference between the signal of the primary beam, i.e. the CPP signal, and the summation signal of the 2nd-order secondary beams, as follows:

$$DPP=CPP-K*(OPP3+OPP4) \tag{21}$$

The sum of the push-pull signals of the two first-order secondary beams again yields a voltage which is proportional to the lens movement l of the objective lens, without a track error contribution, since the track error components, as described above, cancel one another out, so that the desired lens position signal can be derived directly from this summation signal:

$$LCE=OPP1+OPP2 \tag{22}$$

In addition, a direction signal indicating the direction with which the scanning beam crosses the tracks with the track regulating circuit open can be derived from the phase relationship of the push-pull signal of one of the secondary beams 15–18 with respect to the push-pull signal of the primary beam 14.

As has already been mentioned in the introduction, for all the above considerations, it was assumed in a simplification that the intensities of the three scanning beams considered are identical when impinging on the photodetector unit 9. The compensation factors G and K respectively specified therefore apply only if this simplification is employed.

In practice, however, the intensity of the secondary beams is dependent on their track position, on the reflection of the scanned track and also on the properties of the optical diffraction grating 3 and is weaker than the intensity of the primary beam, so that the intensity of the secondary beams has to be scaled correspondingly with respect to the primary beam intensity. Ideally, this is done by means of a normalization. To that end, the signals derived from the reflected beams are normalized. The signals CPP and OPP or, as an alternative, the individual signals OPP1 and OPP2 are normalized by dividing these signals by the summation signals which are proportional to the quantity of light respectively taken up by the detector areas. Such a normalization is realized for example in the evaluation unit 10.

Figure 9:
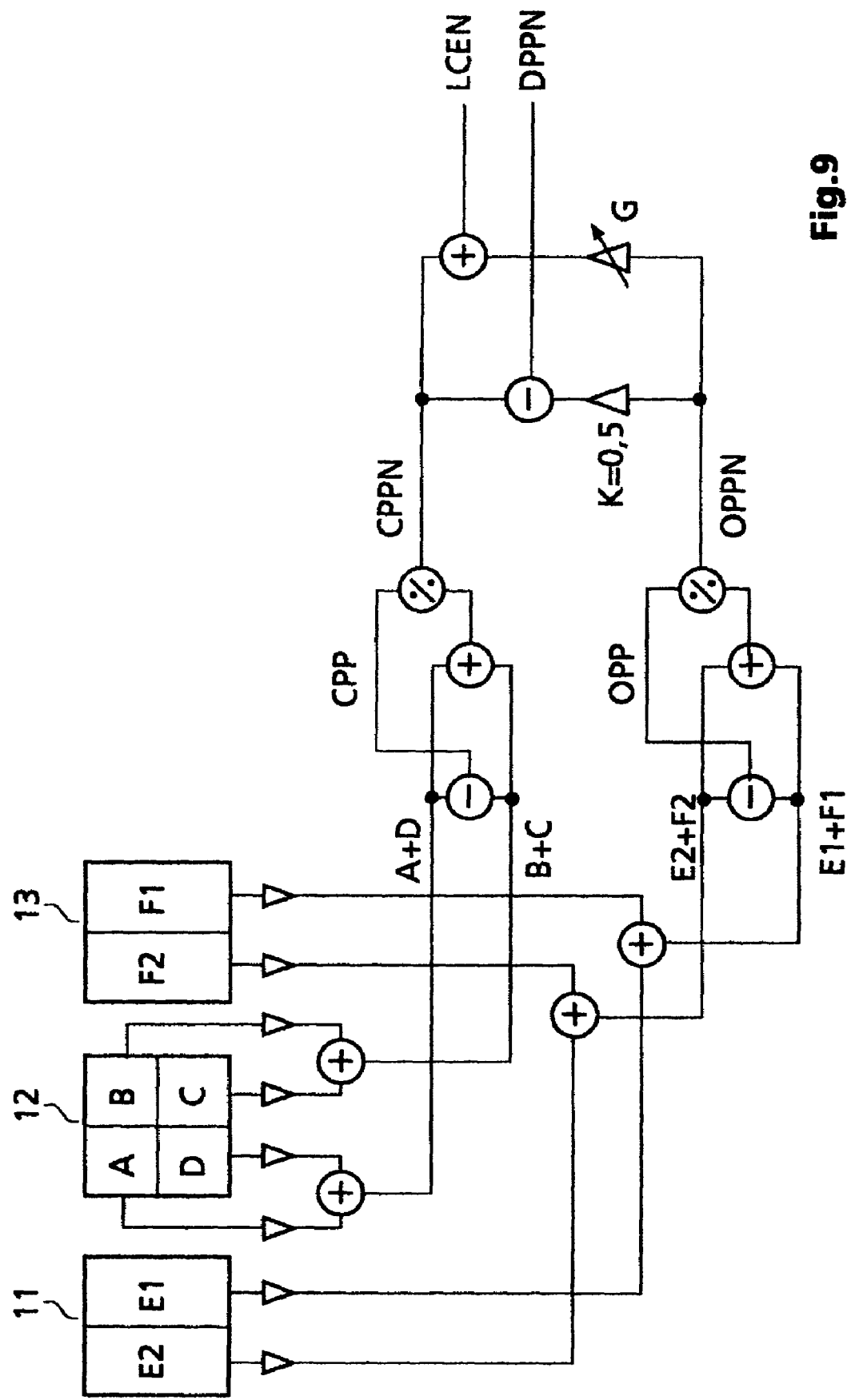
FIG. 9 to FIG. 12 show further variants of the first exemplary embodiment shown in FIG. 3, a normalization being provided.
Figure 10:
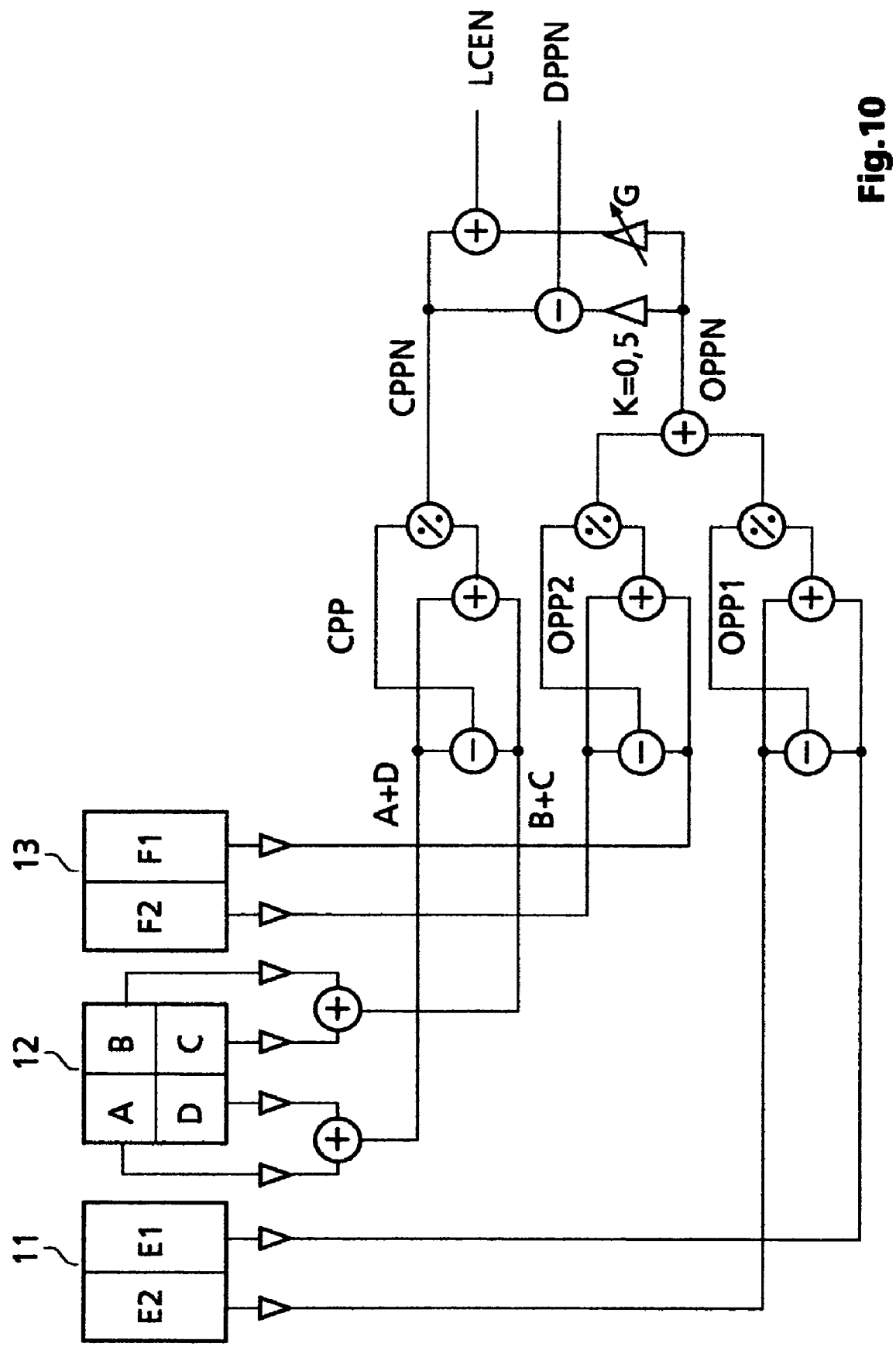

Proceeding from the exemplary embodiment shown in FIG. 3, FIGS. 9 and 10 show two variants of a normalization. FIG. 9 shows an exemplary embodiment of a normalization in each case for the primary beam (CPP) and jointly for the secondary beams (OPP). In this case, the normalized signals are designated as CPPN, OPPN, LCEN and DPPN using an appended "N". FIG. 10 shows an exemplary embodiment in which the push-pull components of the three beams are normalized separately before the signals LCE and DPP are formed therefrom by weighted addition and subtraction, respectively.

As described above, it is necessary to adapt the weighting factor G to the secondary track spacings. By way of example, if the variant shown in FIG. 9 is taken as a basis, then the signal amplitude of the signal LCE is dependent on the setting of the compensation factor G. This is avoided by a further variant of the variants shown in FIGS. 9 and 10, which is described below.

Figure 11:
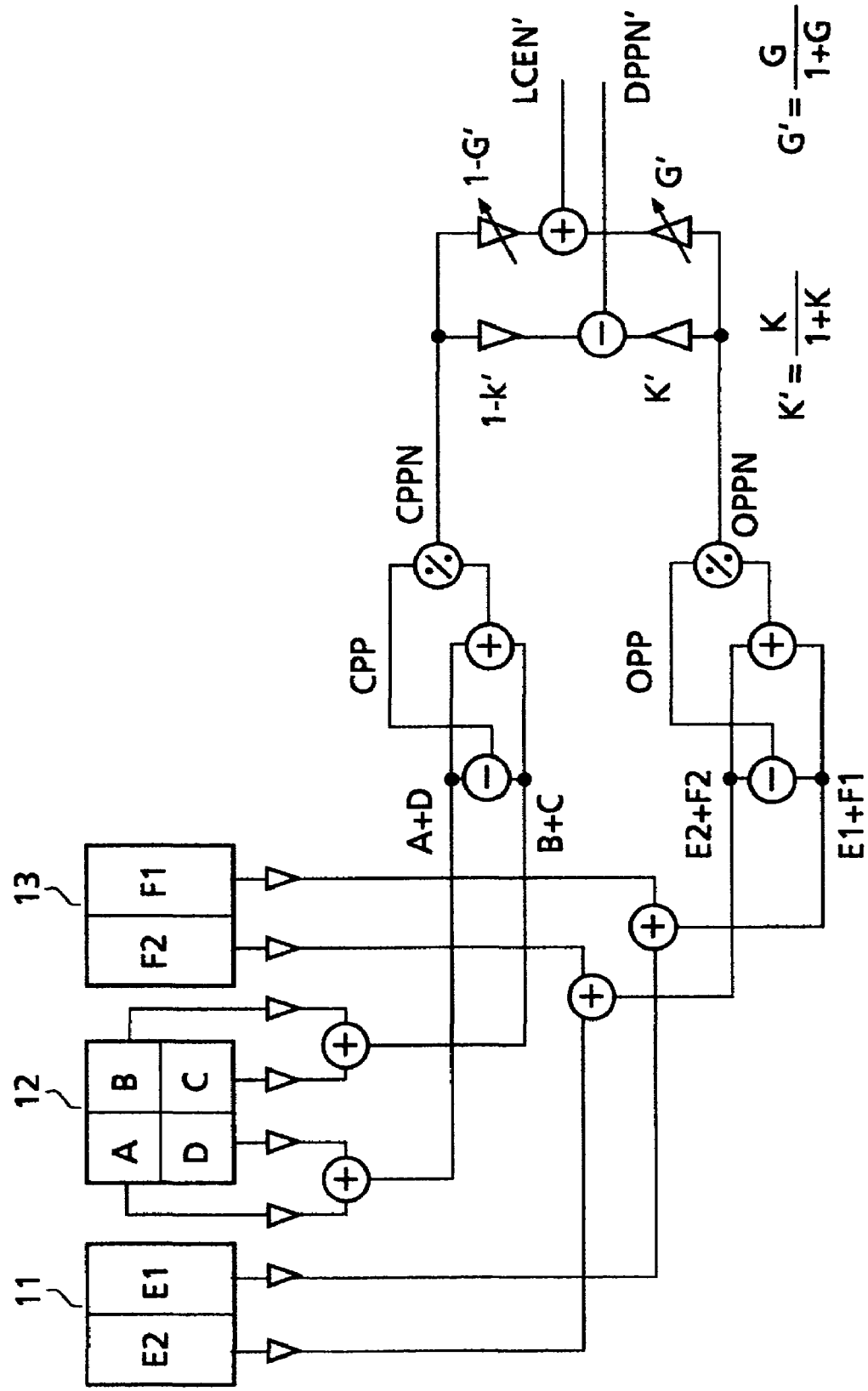
Figure 12:
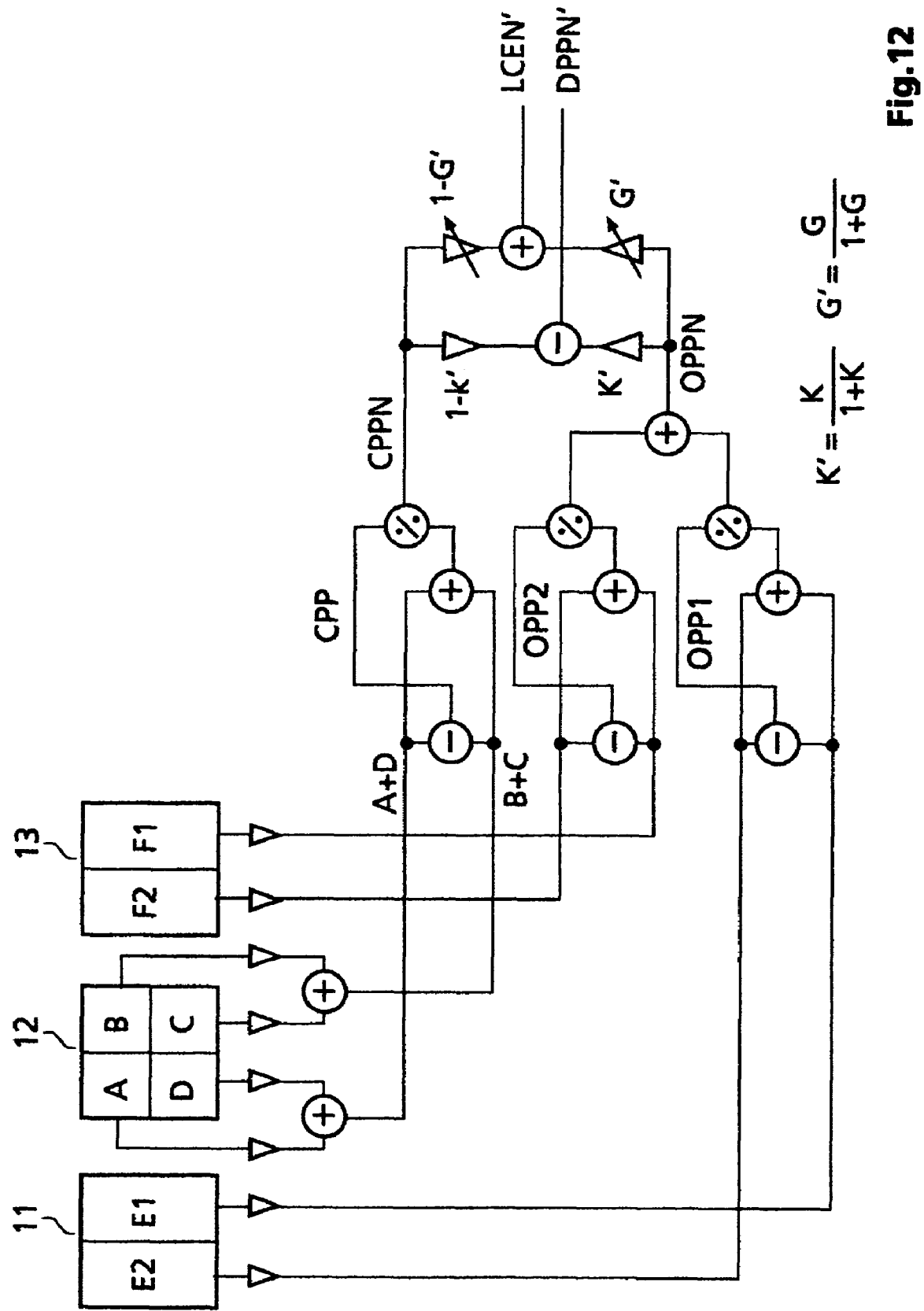

The variant shown in FIGS. 11 and 12, respectively, relates to the weighting between primary beam and secondary beams. It is advantageous, for example, to replace the weighting factor G for the secondary beam signal by two weighting factors G' and 1−G', which act on the primary and secondary beam signals, where G' can be calculated from G according to the following relationships:

$$G' = \frac{G}{(1+G)} \quad (23)$$

What is achieved by splitting the weighting factor G into two weighting factors dependent on G' is that the amplitude of the lens-movement-dependent signal LCE is independent of the respective weighting factor to be set. In an analogous manner, formula (23) can also be applied to the weighting factor K for forming the DPP signal. The factors G and K are chosen for example analogously to FIG. 9 and FIG. 10, respectively. The signals weighted in this way are designated by LCEN' and DPPN'.

The invention claimed is:

1. Method for generating a lens position signal,
   wherein the lens position signal describes the position of the optical axis of an objective lens of an apparatus for reading from and/or writing to an optical recording medium with regard to the optical axis of an optical scanner assigned to the objective lens,
   wherein primary and secondary scanning beams incident on adjacent tracks of the recording medium are generated and the primary and secondary scanning beams reflected from the recording medium are detected, and
   wherein a primary-beam error signal CPP and a secondary-beam error signal OPP are derived from the detected reflected primary and secondary scanning beams, wherein the lens position signal LCE is obtained from the primary-beam error signal CPP and the secondary-beam error signal OPP in accordance with the following relationship;

LCE=CPP−G*OPP.

wherein the weighting factor G is chosen in such a way that the following holds true:

$$1 - 2G\cos\left(\pi * \frac{\Delta x}{p}\right) = 0$$

wherein Δx designates the distance between the secondary beams and the primary beam and p designates the track spacing of the optical recording medium.

2. Method according to claim 1, wherein the weighting factor G is set variably in a manner dependent on the distance between the secondary beams and the primary beam and the track spacing of the optical recording medium.

3. Method according to claim 1, wherein, in order to form the lens position signal LCE, a normalization is applied to the primary-beam error signal CPP and the secondary-beam error signal OPP.

4. Method according to claim 1, wherein the lens position signal LCE is obtained from the primary-beam error signal CPP and the secondary-beam error signal OPP in accordance with the following relationship:

$$LCE = (1 - G') * CPP - G' * OPP \text{ where } G' = \frac{G}{(1+G)}$$

wherein G describes a weighting factor.

5. Method according to claim 1, wherein a track error signal DPP is additionally obtained by subtraction of the secondary-beam error signal OPP from the primary-beam error signal CPP.

6. Method according to claim 5, wherein the track error signal DPP is obtained from the primary-beam error signal CPP and the secondary-beam error signal OPP, in which the lens-movement-dependent component tends to zero by setting a suitable compensation factor K, formed according to the following relationship:

DPP=CPP−K*OPP.

7. Method according to claim 5, wherein, in order to form the track error signal DPP, a normalization is applied to the primary-beam error signal CPP and the secondary-beam error signal OPP, and in that this normalization is simultaneously used to form the lens position signal LCE.

8. Method according to claim 5, wherein the track error signal DPP is obtained from the primary-beam error signal CPP and the secondary-beam error signal OPP in accordance with the following relationship:

$$DPP = (1-K') * CPP - K' * OPP \text{ where } K' = \frac{K}{1+K}$$

wherein K describes a compensation factor.

9. Apparatus for reading from and/or writing to an optical recording medium,
- having a beam generating unit for generating primary and secondary scanning beams incident on adjacent tracks on the optical recording medium,
- having a photodetector unit for detecting the primary and secondary scanning beams reflected from the optical recording medium, and
- having an evaluation unit for forming a primary-beam error signal CPP and a secondary-beam error signal OPP from the detected primary and secondary scanning beams, wherein the evaluation unit is configured in such a way that it generates a lens position signal LCE, which describes the position of the optical axis of an objective lens of the apparatus with regard to the optical axis of an optical scanner—assigned to the objective lens—of the apparatus, in a manner dependent on the primary-beam error signal CPP and the secondary-beam error signal OPP in accordance with the following relationship:

$$LCE = CPP - G*OPP,$$

wherein G describes a weighting factor which is chosen in such a way that the following holds true:

$$1 - 2G\cos\left(\pi * \frac{\Delta x}{p}\right) = 0,$$

wherein Δx describes the distance between the secondary beams and the primary beam and a describes the track spacing on the optical recording medium.

10. Apparatus according to claim 9, wherein the evaluation unit is configured in such a way that, in order to form the lens position signal LCE, it applies a normalization to the primary-beam error signal CPP and the secondary-beam error signal OPP.

11. Apparatus according to claim 9, wherein the lens position signal LCE is obtained from the primary-beam error signal CPP and the secondary-beam error signal OPP in accordance with the following relationship:

$$LCE = (1-G') * CPP - G' * OPP \text{ where } G' = \frac{G}{(1+G)}$$

wherein G describes a weighting factor.

12. Apparatus according to claim 9, wherein the evaluation unit is configured in such a way that it additionally obtains a track error signal DPP by subtraction of the secondary-beam error signal OPP from the primary-beam error signal CPP, in which track error signal the lens-movement-dependent component tends to zero by setting a suitable compensation factor K, formed according to the following relationship:

$$DPP=CPP-K*OPP.$$

13. Apparatus according to claim 12, wherein the evaluation unit is configured in such a way that, in order to form the track error signal DPP, it applies a normalization to the primary-beam error signal CPP and the secondary-beam error signal OPP and simultaneously uses this normalization to form the lens position signal LCE.

14. Apparatus according to claim 12, wherein the track error signal DPP is obtained from the primary-beam error signal CPP and the secondary-beam error signal OPP in accordance with the following relationship:

$$DPP = (1-K') * CPP - K' * OPP \text{ where } K' = \frac{K}{(1+K)}.$$

* * * * *